United States Patent
Amendola et al.

(10) Patent No.: US 6,524,542 B2
(45) Date of Patent: *Feb. 25, 2003

(54) PROCESSES FOR SYNTHESIZING BOROHYDRIDE COMPOUNDS

(75) Inventors: Steven C. Amendola, Ocean, NJ (US); Michael T. Kelly, Plainsboro, NJ (US); Ying Wu, Red Bank, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 44 days.

This patent is subject to a terminal disclaimer.

(21) Appl. No.: 09/833,904

(22) Filed: Apr. 12, 2001

(65) Prior Publication Data

US 2003/0003038 A1 Jan. 2, 2003

(51) Int. Cl.⁷ .................................. C01B 6/10
(52) U.S. Cl. .................. 423/286; 423/287; 423/288
(58) Field of Search .................... 423/294, 286, 423/288; 422/287

(56) References Cited

U.S. PATENT DOCUMENTS

| | | |
|---|---|---|
| 2,469,879 A | 5/1949 | Hurd |
| 2,534,533 A | 12/1950 | Schlesinger et al. |
| 2,684,888 A | 7/1954 | Pryde |
| 2,720,444 A | 10/1955 | Banus et al. |
| 2,741,539 A | 4/1956 | Banus et al. |
| 2,855,353 A | 10/1958 | Huff et al. |
| 2,889,194 A | 6/1959 | McElroy et al. |
| 2,926,989 A | 3/1960 | Pryde |
| 2,926,991 A | 3/1960 | Bragdon |
| 2,928,719 A | 3/1960 | Berner et al. |
| 2,934,401 A | 4/1960 | Hansley et al. |
| 2,938,767 A | 5/1960 | Huff et al. |
| 2,939,762 A | 6/1960 | Berner et al. |
| 2,942,935 A | 6/1960 | King et al. |

(List continued on next page.)

FOREIGN PATENT DOCUMENTS

| | | |
|---|---|---|
| CN | 86108142 | 6/1988 |
| CS | 148173 | 5/1972 |
| DE | 947702 | 8/1956 |
| DE | 949943 | 9/1956 |
| DE | 950062 | 10/1956 |
| DE | 950846 | 10/1956 |
| DE | 1036222 | 8/1958 |
| DE | 1053476 | 3/1959 |
| DE | 1058478 | 6/1959 |
| DE | 1095797 | 12/1960 |
| DE | 1262981 | 3/1968 |
| EP | 0313306 | 4/1989 |
| FR | 1301172 | 7/1962 |
| GB | 853727 | 11/1960 |
| GB | 1104200 | 2/1968 |
| JP | 2100376 | 4/1990 |
| NL | 6613329 | 9/1966 |
| WO | 0174710 | 10/1901 |

OTHER PUBLICATIONS

CA:75:145084 abs of Tr. Kazan. Khim–Tekhnol. Inst. by Mochalov et al 40(1) pp 203–211 1969.*

CA:122:22560 abs of Journal of American Chem Society by Godfroid et al 116(26) pp 12107–12108 1994.*

CA:82:50890 abs of Izv. Akad. Nauk. SSR. Ser, Khim by Titiov et al (11) pp 2410–2414 1974.*

CA:100:60908 abs of Acta Cient. Venez by A. Barriola 34(1) pp 25–27 1983.*

(List continued on next page.)

Primary Examiner—Jean F. Vollano
(74) Attorney, Agent, or Firm—Gibbons, Del Deo, Dolan, Griffinger & Vecchione

(57) ABSTRACT

Processes for synthesizing borohydride compounds with reduced energy requirements are disclosed.

21 Claims, 1 Drawing Sheet

U.S. PATENT DOCUMENTS

| | | | |
|---|---|---|---|
| 2,955,911 | A | 10/1960 | Edwards et al. |
| 2,964,378 | A | 12/1960 | Brown et al. |
| 2,969,274 | A | 1/1961 | Kyllonen |
| 2,970,894 | A | 2/1961 | Chappelow et al. |
| 2,974,015 | A | 3/1961 | Peterson |
| 2,983,574 | A | 5/1961 | Nigon |
| 2,983,575 | A | 5/1961 | Cohen et al. |
| 2,985,510 | A | 5/1961 | Kalb |
| 2,992,072 | A | 7/1961 | Huff et al. |
| 2,992,266 | A | 7/1961 | McElroy |
| 3,002,806 | A | 10/1961 | Governale et al. |
| 3,014,059 | A | 12/1961 | Bush et al. |
| 3,014,060 | A | 12/1961 | Bush et al. |
| 3,021,197 | A | 2/1962 | Clark et al. |
| 3,022,138 | A | 2/1962 | Clark et al. |
| 3,028,221 | A | 4/1962 | Schechter et al. |
| 3,029,128 | A | 4/1962 | Chamberlain |
| 3,042,485 | A | 7/1962 | Edwards |
| 3,047,358 | A | 7/1962 | Jenkner |
| 3,077,376 | A | 2/1963 | Schubert et al. |
| 3,079,224 | A | 2/1963 | Huff |
| 3,152,861 | A | 10/1964 | Logan et al. |
| 3,161,469 | A | 12/1964 | Ashby et al. |
| 3,164,441 | A | 1/1965 | Goerrig |
| 3,171,712 | A | 3/1965 | Edwards et al. |
| RE25,777 | E | 5/1965 | Schubert et al. |
| 3,216,797 | A | 11/1965 | Murib et al. |
| 3,219,412 | A | 11/1965 | Hunt et al. |
| 3,222,121 | A | 12/1965 | Jenkner et al. |
| 3,306,704 | A | 2/1967 | Campbell et al. |
| 3,433,605 | A | 3/1969 | Knorre et al. |
| 3,459,514 | A | 8/1969 | Johnston et al. |
| 3,468,630 | A | 9/1969 | Raisor et al. |
| 3,471,268 | A | 10/1969 | Bontempelli et al. |
| 3,473,899 | A | 10/1969 | Cooper |
| 3,474,899 | A | 10/1969 | Carlsson et al. |
| 3,505,035 | A | 4/1970 | Horn et al. |
| 3,511,710 | A | 5/1970 | Jung et al. |
| 3,515,522 | A | 6/1970 | Pecak et al. |
| 3,993,732 | A | 11/1976 | Filby |
| 4,002,726 | A | 1/1977 | Filby |
| 4,070,261 | A * | 1/1978 | Merritt et al. ......... 204/157.41 |
| 4,904,357 | A | 2/1990 | Sharifian et al. |
| 4,931,154 | A | 6/1990 | Hale et al. |
| 5,294,423 | A | 3/1994 | Lorthioir et al. |
| 5,886,229 | A | 3/1999 | Corella et al. |
| 6,433,129 | B1 | 8/2002 | Amendola et al. |

OTHER PUBLICATIONS

U.S. patent application No. 20010022960, titled "Hydrogen generating method and hydrogen generating apparatus" to Kojima et al., filed Sep. 20, 2001.

A. Burg, H.I. Schlesinger; "*Hydrides of Boron. III. Dimethoxyborine*"; J. Am. Chem. Soc., Oct. 1933, 55, p. 4020–4025.

H.C. Brown, H.I. Schlesinger, A. Burg; "*Hydrides of Boron. XI. The Reaction of Diborane with Organic Compounds Containing a Carbonyl Group*"; J. Am. Chem. Soc., Mar. 1939, 61, p. 673–680.

Schlesinger, H.I.; Brown, H.C.; Hoekstra, H.R.; Rapp, L.R.; "*Reactions of Diborane with Alkali Metal Hydrides and Their Additional Compounds. New Syntheses of Borohydrides. Sodium and Potassium Borohydrides*"; J. Am. Chem. Soc., Jan. 5, 1953, 75, p. 199–204.

Brown, H.C.; Schlesinger, H.I.; Sheft, I.; Ritter, D.M.; *New Developments in the Chemistry of Diborane and the Borohydrides*. J. Am. Chem. Soc., Jan. 5, 1953, 75, 186–225.

A.J. King, F.A. Kanda, V.A. Russell, & Walter Katz, *A New Method for the Preparation of Borohydrides*, Syracuse University, Syracuse, NY), J.Am. Chem. Soc., vol. 78, p. 4176, Jun. 19, 1956.

Jolles, Z.E., "Bromine and Its Compounds", Academic Press, pp. 81–89, 1966.

Hughes, R.L., *Production of the Boranes and Related Research*; Midwest Research Institute, 1967;.

Herbert C. Brown, Yong Moon Choi and S. Narasimhan for "*Additional Compounds of Alkali Metal Hydrides. 22. Convenient Procedures for the Preparation of Lithium Borohydride from Sodium Borohydride and Borane–Demethyl Sulfide in Simple Ether Solvents*", Inorg. Chem. pp. 3657–3661, Mar. 25, 1982.

Huheey, James E., "Inorganic Chemistry", 3rd Edition, Harper Collins, Chapter 14, 1983.

Hubbard, John L., Tetrahedron Letters; *Purification of Sodium and Potassium Hydrides; Preparation of Trialkylborohydrides with Exceptionally Large Steric Requirements*; J. American Chem. Soc., 1988, 29, 3197–3200;.

"CRC Handbook of Chemistry and Physics", 69th Edition, 1988–1989.

Russian Article, Tom 34, 1989.

Shriver et al., "Inorganic Chemistry", W.H. Freeman Company, 1990, pp. 170–175.

S. Narasimhan; K. Ganeshwar Prasad and S. Madhavan, *Calcium Borohydride: A Reagent For Facile Conversion of Carboxylic Esters to Alcohols and Aldehydes*, Synthetic Communications, 25(11), 1689–1697 (1995).

* cited by examiner

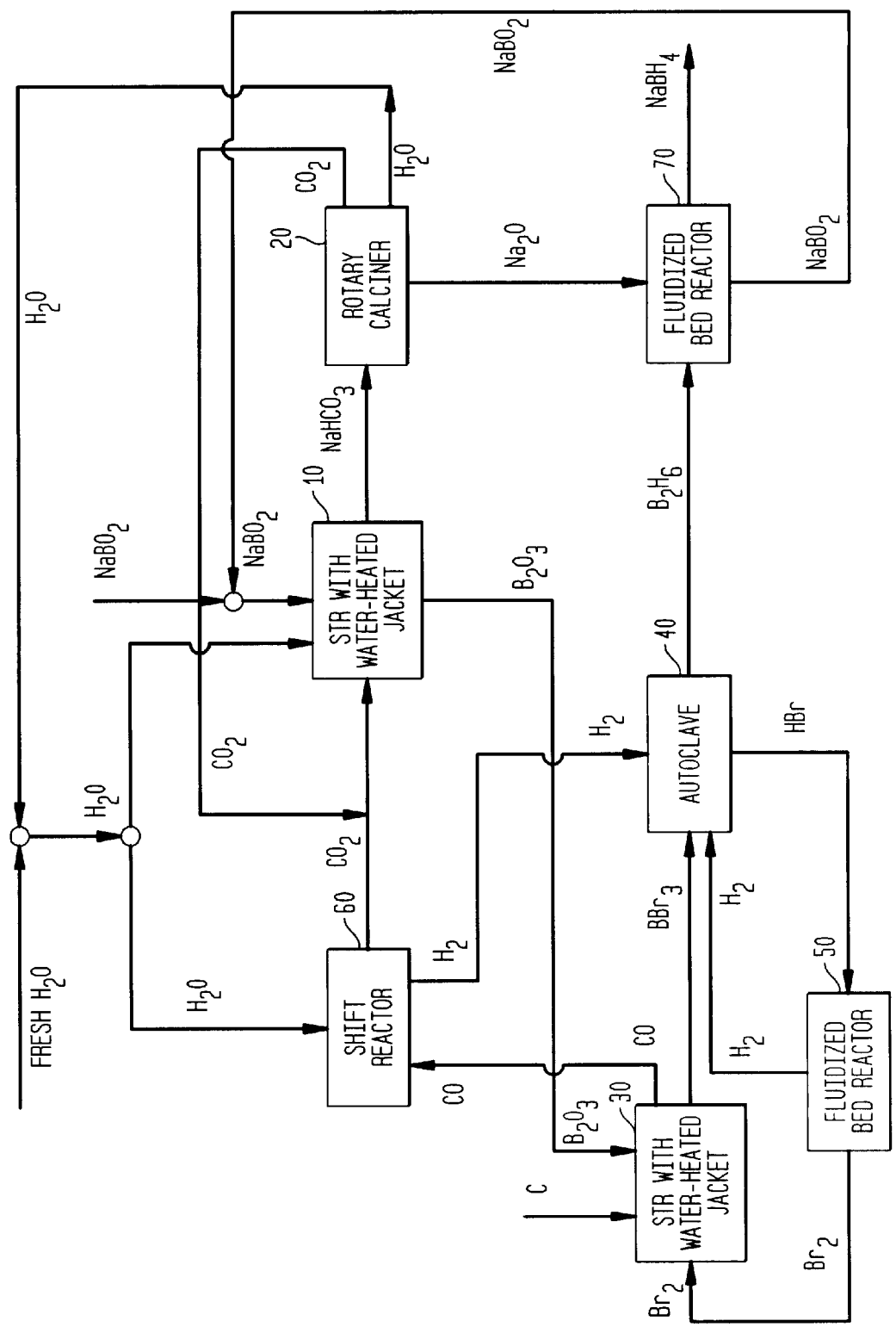

PROCESSES FOR SYNTHESIZING BOROHYDRIDE COMPOUNDS

FIELD OF THE INVENTION

The present invention relates to processes for synthesizing borohydride compounds, and more particularly to processes of synthesizing borohydride compounds with reduced energy requirements.

BACKGROUND OF INVENTION

Environmentally friendly fuels (e.g., alternative fuels to hydrocarbon based energy sources) are currently of great interest. One such fuel is borohydride, which can be used directly as an anodic fuel in a fuel cell or as a hydrogen storage medium (e.g., hydrogen can be liberated by the reaction of sodium borohydride with water, which produces sodium borate as a byproduct). As with all fuels, acceptance of borohydride in the commercial market is partially dependent on the availability of industrial scale quantities.

Typical industrial processes for the production of sodium borohydride are based on the Schlesinger process (Equation 1) or the Bayer process (Equation 2), which are both described below. Equation 1 illustrates the reaction of alkali metal hydrides with boric oxide, $B_2O_3$, or trimethoxyborate, $B(OCH_3)_3$, at high temperatures (e.g., ca. 330 to 350° C. for $B_2O_3$ and 275° C. for $B(OCH_3)_3$). These reactions, however, provide poor molar economy by requiring four moles of sodium to produce one mole of sodium borohydride.

$$4NaH + B(OCH_3)_3 \rightarrow 3NaOCH_3 + NaBH_4 \quad (1)$$

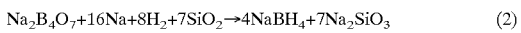
$$Na_2B_4O_7 + 16Na + 8H_2 + 7SiO_2 \rightarrow 4NaBH_4 + 7Na_2SiO_3 \quad (2)$$

The primary energy cost of these processes stems from the requirement for a large excess of sodium metal (e.g., 4 moles of sodium per mole of sodium borohydride produced). Sodium metal is commercially produced by electrolysis of sodium chloride with an energy input equivalent to about 17,566 BTU (18,528 KJ) per pound of sodium borohydride produced. In contrast, the hydrogen energy stored in borohydride is about 10,752 BTU (11,341 KJ) of hydrogen per pound of sodium borohydride. The Schlesinger process and the Bayer process, therefore, do not provide a favorable energy balance, because the energy cost for producing sodium significantly outweighs the energy provided from sodium borohydride as a fuel.

Furthermore, in view of the large quantities of borohydride needed for use, e.g., in the transportation industry, these processes would also produce large quantities of waste products such as $NaOCH_3$ or $Na_2SiO_3$. Since these byproducts are not reclaimed or reused, further energy and expense is required to separate and dispose of these by-products.

Improvements found in the prior art are basically simple modifications of the Schlesinger and Bayer processes represented by equations (1) and (2). Accordingly, such improvements also suffer from the disadvantages stated above, and do not provide any improved energy efficiency or an environmentally sensitive option for disposal of the by-products.

In view of the above, there is a need for improved and energy efficient industrial scale manufacturing processes for producing borohydride compounds. In addition, there is a need for industrial scale processes that reduce or avoid the production of large quantities of waste products that require further disposal.

Accordingly, it is an object of the present invention to provide industrial processes of producing borohydrides with improved energy efficiency. It is also an object of the present invention to provide processes of producing borohydride with reduced levels of unwanted waste products.

SUMMARY OF THE INVENTION

The present invention provides processes for producing large quantities of borohydride compounds, which overcome the above-described deficiencies. In addition, the efficiency of the processes of the present invention can be greatly enhanced over the typical processes for producing borohydride compounds.

In one embodiment of the present invention, a process is provided for producing borohydride compounds, which includes: (A) reacting carbon dioxide and water with a Y-containing compound (i.e., a metaborate compound) of formula $YBO2$ to obtain a bicarbonate compound of the formula $YHCO_3$ and boron oxide; (B) converting $YHCO_3$ into $Y_2O$, carbon dioxide, and water; (C) reacting the boron oxide with carbon and a halide compound of formula $X_2$ to obtain $BX_3$ and carbon monoxide; (D) reacting the $BX_3$ with hydrogen to obtain diborane and $HX$; and (E) reacting the $Y_2O$ with diborane to obtain $YBO_2$ and $YBH_4$. In accordance with the invention, Y is a monovalent cationic moiety such as an alkali metal (e.g., H, Li, Na, K, Rb, Cs, and Fr), a pseudo-alkali metal (e.g., Tl), an ammonium ion ($NH_4^+$), or a quaternary amine of formula $NR_4^+$; R is independently hydrogen, or straight or branched $C_1$ to $C_4$ alkyl group; and X is a halide (F, Cl, Br, I, or At).

In another embodiment of the present invention, a process is provided for producing borohydride compounds, which includes substituting steps (B1) and (E1) for steps (B) and (E): where (B1) entails reacting the $YHCO_3$ to produce $Y_2CO_3$, carbon dioxide, and water; and (E1) entails reacting the $Y_2CO_3$ with diborane to produce $YBH_4$, $YBO_2$, and carbon dioxide. Y and X are the same as defined above.

BRIEF DESCRIPTION OF THE DRAWINGS

Further objects and advantages of the present invention will be more fully appreciated from a reading of the detailed description when considered with the accompanying drawings wherein:

FIG. 1 is a flow diagram, which illustrates one embodiment for producing borohydride compounds in accordance with the present invention.

DETAILED DESCRIPTION OF THE INVENTION

The present invention includes processes for producing borohydride compounds from alkali metal borates. In accordance with the present invention, these processes can be conducted in a batchwise or continuous manner, as is well-known to the skilled artisan. The term "about," as used herein, means ±10% of the stated value.

The processes of the invention substantially reduce the dependence on excess sodium metal that exists in current industrial processes, thereby decreasing the energy cost commonly associated with borohydride production. The processes of the present invention also allow for recycling of excess reagents and byproducts produced within the process in order to provide greater efficiency in the production of sodium borohydride.

In accordance with the present invention the basic starting material is a metaborate compound having the formula $YBO_2$, where Y is a monovalent cationic moiety. Examples of monovalent cationic moieties to be used include, but are not limited to, alkali metals (e.g., Li, Na, K, Rb, Cs, and Fr), pseudo-alkali metals (e.g., Tl), an ammonium ion ($NH_4^+$), and quaternary amines of formula $NR_4^+$, where R is hydrogen or a straight or branched $C_1$ to $C_4$ alkyl group. In a preferred embodiment, Y is Na, Li, or K, with Na or Li being more preferred.

Using the metaborate compound, reactions can be conducted to synthesize the Y-containing compounds, i.e., $Y_2O$ or $Y_2CO_3$, and a boron-containing compound, i.e., $BX_3$, from the $YBO_2$. X is a halide (i.e., F, Cl, Br, I, or At). For example, in one embodiment of this process, the Y-containing compound and the boron-containing compound are obtained by the following set of chemical reactions (3) through (6):

$$4YBO_2+4CO_2+2H_2O \rightarrow 4YHCO_3+2B_2O_3 \tag{3}$$

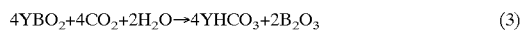

$$4YHCO_3 \rightarrow 2Y_2O+4CO_2+2H_2O \tag{4}$$

$$12HX \rightarrow 6H_2+6X_2 \tag{5}$$

$$2B_2O_3+6C+6X_2 \rightarrow 4BX_3+6CO \tag{6}$$

In reaction (6), elemental carbon is obtained from coke or coal.

In another embodiment, the Y-containing compound is obtained by replacing reaction (4) with the following reaction (4i):

$$4YHCO_3 \rightarrow 2Y_2CO_3+2CO_2+2H_2O \tag{4i}$$

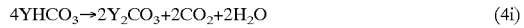

The conversion of $YHCO_3$ into the above-described end products is achieved by thermal decomposition (i.e., heating). Preferably, reaction (4i) is conducted at a temperature from about 50 to about 100 ° C. in an appropriate apparatus, such as a rotary drier. Dehydration of sodium bicarbonate can be performed between 0 and 1 atmospheres. The solid $Y_2CO_3$ is removed from the gaseous steam and carbon dioxide by any method or process known in the art.

After the Y-containing compound and the boron-containing compound have been obtained, a Y-borohydride is synthesized using a variety of processes known in the art. In one embodiment, where reactions (3) through (6) are used to obtain the Y-containing compound and the boron-containing compound, the Y-borohydride can be obtained by the following set of equations (7) through (9):

$$6CO+6H_2O \rightarrow 6H_2+6CO_2 \tag{7}$$

$$4BX_3+12H_2 \rightarrow 2B_2H_6+12HX \tag{8}$$

$$2Y_2O+2B_2H_6 \rightarrow 3YBH_4+YBO_2 \tag{9}$$

Optionally, the hydrogen in equation (8) can be substituted with an aldehyde such as formaldehyde ($CH_2O$), benzaldehyde ($C_6H_5CHO$), or acetaldehyde ($CH_3CHO$) in the presence of metal catalyst. Preferably, copper is used as the metal catalyst, but silver and gold may also be used. These reactions can be run in an appropriate pressurized apparatus, such as an autoclave, at about 380 to about 420° C. One skilled in the art would recognize that the stoichiometry of equation (8) would have to be adjusted accordingly.

Alternatively, when reaction (4i) is substituted for reaction (4), the following reaction (9i) can be substituted for reaction (9):

$$2Y_2CO_3+2B_2H_6 \rightarrow 3YBH_4+YBO_2+2CO_2 \tag{9i}$$

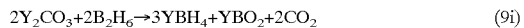

The reaction of equation (9i) can be conducted by adding heat in the presence of carbon, as is described in Hughes, "Production of the Boranes and Related Research," pp. 12.

The overall process of these embodiments results in the following net reaction:

$$3YBO_2+6C+6H_2O \rightarrow 3YBH_4+6CO_2 \tag{10}$$

In one preferred embodiment of the present invention, $YBO_2$ is sodium borate and HX is HBr. The sodium borate is reacted with carbon dioxide and water to form $NaHCO_3$ and $B_2O_3$. The $NaHCO_3$ is converted into sodium oxide, carbon dioxide, and water. The HBr is converted into hydrogen and bromine by passage over a metal catalyst such as platinum metal or platinized silica gel at temperatures ranging from about 100 to about 500 ° C., preferably from about 200 to 400° C. The boron oxide is reacted with elemental carbon and bromine to form boron bromide ($BBr_3$) and carbon monoxide. The carbon monoxide and water are reacted to form hydrogen and carbon dioxide. The $BBr_3$ is reacted with hydrogen to form diborane and HBr. Finally, the sodium oxide is reacted with diborane to form sodium borate and sodium borohydride, the desired end-product. This process can be further described in part by the following set of chemical reactions and formulae.

A preferred embodiment of the invention is illustrated in FIG. 1 utilizing sodium borate as the metaborate compound. In the first step, sodium borate, carbon dioxide, and water are reacted to form $NaHCO_3$ and diborane, as provided in equation (11).

$$4NaBO_2+4CO_2+2H_2O \rightarrow 4NaHCO_3+2B_2O_3 \tag{11}$$

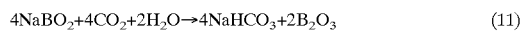

For example, a suitable vessel for this reaction is a stirred tank reactor with a water-heated jacket 10, as illustrated in FIG. 1. In such an apparatus, a slurry of sodium borate and water can be stirred in a reactor equipped with a paddle type stirrer at temperatures ranging from about room temperature to about 250° C., preferably from about 175 to about 200° C. The reactor is preferably pressurized with carbon dioxide at a pressure from about 10 (0.68 atm) to about 750 psi (51 atm.), preferably from about 30 to about 40 atm. The boron oxide produced is removed from the reactor by any method or process known to one skilled in the art, such as by filtration.

The sodium bicarbonate ($NaHCO_3$) produced in the reaction of equation (11) is converted into sodium oxide, water, and carbon dioxide, as shown in equation (12).

$$4NaHCO_3 \rightarrow 2Na_2O+4CO_2+2H_2O \tag{12}$$

For example, this reaction can be performed in a rotary calciner (kiln) 20, such as a model manufactured by the Bethlehem Corporation. A slurry of sodium bicarbonate can be heated to a temperature from about 450 to about 1000° C., preferably from about 800 to about 900° C., at a pressure from about 0 to about 5 atm., preferably from about 0 to about 1 atm., in a rotary dryer with a heated screw agitator, which disperses the slurry along the length of the reactor. Solid sodium oxide can be separated from a gas stream of carbon dioxide and steam by any method or process known to the skilled artisan. The water and carbon dioxide formed in equation (12) can be recycled back to react in equation (11).

The $B_2O_3$ formed in equation (11) reacts with bromine and carbon in an appropriate reactor to form carbon monoxide and $BBr_3$, as shown in equation (13).

$$2B_2O_3 + 6C + 6Br_2 \rightarrow 4BBr_3 + 6CO \qquad (13)$$

This reaction can be performed in a stirred tank reactor reactor with a water-heated jacket 30. Reactions of boric oxides are well-known in the art, as described in Hughes, "Production of the Boranes and Related Research," p. 3. Elemental carbon used in this reaction is obtained from coke or coal.

Typically, $BBr_3$ is obtained by heating solid boron oxide and carbon coal. Heating can be conducted in an autoclave under an inert atmosphere with a temperature between about 250 and about 850° C., with between about 600 and about 700° C. being more preferred. The reactor can be pressurized with halogen gas, at a pressure of from between about atmospheric pressure (1 atm.) to about 500 psi (34 atm.), preferably from between about 5 and about 10 atm. The boron ltbromide can be condensed from the gas stream and isolated as a liquid by any method and/or process known to the skilled artisan.

The use of excess elemental carbon allows the in situ reduction of carbon dioxide to carbon monoxide as illustrated by the following chemical reaction: $CO_2 + C \rightarrow 2CO$. The resulting carbon monoxide can then be introduced into a shift reactor to react with steam to produce additional process hydrogen.

The boron tribromide produced in equation (13) reacts with hydrogen to produce diborane and HBr, as shown in equation (14).

$$4BBr_3 + 12H_2 \rightarrow 2B_2H_6 + 12HBr \qquad (14)$$

As shown in FIG. 1, this reaction can take place in an autoclave 40. The reduction of $BX_3$ species (where X is a halide, such as F, Cl, Br, I, or At) to diborane can be achieved by direct hydrogenation or by transfer hydrogenation, such as the reaction of equation (8). Alternative transfer hydrogenation conditions include reaction with a hydride of the formula $R_3MH$, where "M" is silicon, germanium, lead, and tin, with silicon and tin being preferred. The "R" substituents are independently an alkyl or aryl group such as a branched or linear $C_1$ to $C_6$ alkyl group, a substituted or unsubstituted phenyl group (—$C_6H_5$), a halide, or hydrogen (i.e., the "R" groups can be the same or different). Preferred reagents are silicon hydrides, referred to as the silanes, which react with boron trihalides as shown in equation (14i):

$$4BCl_3 + 3SiH_4 \rightarrow 2B_2H_6 + 3SiCl_4 \qquad (14i)$$

Preferred reaction conditions include combining gas streams of $BCl_3$ and a silane maintained at temperatures between about 0 and about 170° C. (preferably between about 60 and about 100° C.) under an inert atmosphere, such as nitrogen or argon. At these temperatures, diborane is produced as a gas, and silicon tetrachloride can be separated by cooling the gas stream to between about 20 and about 55° C. Alternatively, $BCl_3$ and silane can be stirred in an organic ether, such as diglyme, tetraglyme, or tetrahydrofuran, under the conditions given above. This reduction is applicable to all embodiments of the process.

The HBr produced in reaction (14) is converted to hydrogen and bromine, as shown in equation (15).

$$12HBr \rightarrow 6H_2 + 6Br_2 \qquad (15)$$

This reaction can be performed in a fluidized bed reactor 50, as shown in FIG. 1. A gas stream of HBr can be passed over a metal catalyst such as platinum metal or platinized silica gel at temperatures ranging from about 100 to about 500° C., preferably from about 200 to about 400° C. The reaction can be driven to completion by condensing bromine from the product gas stream at temperatures between about 0 and about 60° C. For 100% conversion of HBr to its elements, it may be necessary to recycle the product gas stream over the catalyst to completely consume HBr. These processes are described in Jolles, Bromine and Its Compounds (Academic Press 1996), which is incorporated herein by reference.

Carbon monoxide formed in equation (13) is reacted with water to form hydrogen and carbon dioxide, as shown in equation (16).

$$6CO + 6H_2O \rightarrow 6H_2 + 6CO_2 \qquad (16)$$

This reaction can be run in an appropriate pressurized apparatus, such as a shift reactor 60 as shown in FIG. 1. As is well-known to the skilled artisan, such an apparatus allows the reduction of carbon monoxide and steam by passing the gas stream over iron and copper catalysts at about 425° C. to produce hydrogen and carbon dioxide. The carbon dioxide formed in this reaction is recycled back for use in equation (11). The hydrogen is recycled back for use in equation (14). The water consumed in reaction (16) may be obtained from the water produced in equation (12) and/or from commercial sources.

The diborane produced in equation (14) is reacted with sodium oxide in an appropriate reactor to produce sodium borate and sodium borohydride, the desired end-product, as shown below in equation (17).

$$2Na_2O + 2B_2H_6 \rightarrow 3NaBH_4 + NaBO_2 \qquad (17)$$

As shown in FIG. 1, this reaction is performed in an appropriate reactor, such as a fluidized bed reactor 70 (dry, with a gas stream) or a jacketed stirred tank reactor, not shown (with a solvent). In a fluidized bed reactor, a gas stream of diborane at pressures ranging from about atmospheric (1 atm.) to about 100 psi (6.8 atm.) can be passed through solid sodium oxide at temperatures ranging from about −30° C. to about 70° C., preferably from about 0° C. to about 40° C., under inert atmosphere, such as nitrogen or argon gas. Alternatively, in a reactor equipped with paddle type stirring and a jacket that allows water heating or cooling, diborane can be bubbled through a slurry of sodium oxide in a glyme at temperatures ranging from about −30° C. to about 70° C., preferably from about 0° C. to about 40° C., under an inert atmosphere, such as nitrogen or argon gas. The resulting sodium borohydride can then be separated from sodium borate by any process or method known to the skilled artisan, such as by liquid extraction. The separated sodium borate can be recycled for use in the initial step of the process, i.e., the reaction of equation (11).

Alternatively, diborane can undergo asymmetric cleavage and subsequent disproportionation, as shown in reaction (17), by reaction with any small, hard base, such as $F^-$, $OH^-$, $O^{2-}$, $NH_3$, $Cl^-$, $CH_3NH_2$, and $(CH_3)_2NH$. Additional examples of hard bases are provided in Shriver et al., *Inorganic Chemistry* (1990, W.H. Freeman Company), which is incorporated herein by reference. In a concentrated aqueous sodium hydroxide solution, for example, at reduced temperatures (e.g., from about −40° C. to about 0° C., preferably at about −20 ° C.), disproportionation occurs in two steps: (i) asymmetric cleavage into a borohydride fragment and a $BH_2^+$ fragment which coordinates two hydroxides and then (ii) disproportionation of the $BH_2^+$ fragment into an additional borohydride and a borate.

Water can be replaced with an aprotic solvent or a nonaqueous polar solvent to minimize competitive hydrolysis of the $BH_2^+$ radical and allow the disproportionation to be achieved with higher efficiency, thereby providing greater yield. Hydrolysis, on the other hand, results in the release of hydrogen rather than disproportionation, and a substantial energy loss occurs. Examples of acceptable aprotic solvents include: hydrocarbons, such as hexane or heptane; amides, such as dimethylacetamide; and glymes, such as diethylene glycol dimethyl ether (diglyme) and tetra(ethylene glycol) dimethyl ether (tetraglyme). Water can also be replaced with a nonaqueous polar solvent, such as methanol, ethanol, propanol, and isopropanol.

The net equation of this embodiment is as follows:

$$3NaBO_2 + 6C + 6H_2O \rightarrow 3NaBH_4 + 6CO_2 \tag{18}$$

The overall equation is endothermic, where steps represented by equations (11), (16), and (17) are the key energy producing steps in the process. Thermodynamic values for each of the reactions in this embodiment are shown below. All thermodynamic values are taken from the *CRC Handbook of Chemistry and Physics*, 69th Edition, 1988-1989, which is incorporated herein by reference. The overall process of this embodiment is also favorable in that it is a cyclic process best represented by the listing of all reactions below. As shown, the reaction consumes only carbon, borate, and water to produce sodium borohydride and carbon dioxide. All other reagents are regenerated within the process.

For illustrative purposes, sodium borohydride can be reacted with water to produce hydrogen gas. The energy equivalent of hydrogen gas is about 50,957 BTU per pound. Since each pound of sodium borohydride can theoretically produce about 0.211 pounds of hydrogen gas, each pound of sodium borohydride can theoretically yield about 10,752 BTU. The actual cost of producing borohydride is ascertained by adding 8761 BTU from the above process, 1314 BTU (resulting from 15% plant inefficiency), and 8935 BTU (the energy equivalent of carbon), giving a total of 19,010 BTU required to produce sodium borohydride in the plant. According to this calculation, the energy efficiency of producing sodium borohydride according to this embodiment of the present invention (e.g., the comparison of the energy needed for production versus the energy provided) would be about 57% (10,752/19,010×100).

Calculated on a per pound of sodium borohydride produced basis, the process shown in equation 1 requires 17,566 BTU of energy to drive the reactions. Assuming 15% inefficiency in the plant, about 2634 BTU of energy is lost in normal plant operation, the total energy required is about 20,200 BTU. The resulting energy efficiency of the process is about 53% (10,752/20,200×100).

In another embodiment of the present invention, $YBO_2$ is sodium borate and HX is HBr, the following reactions can be substituted for equations (12) and (17), as shown below in equations (12i) and (17i).

$$4NaHCO_3 \rightarrow 2Na_2CO_3 + 2CO_2 + 2H_2O \tag{12i}$$

$$2Na_2CO_3 + 2B_2H_6 \rightarrow 3NaBH_4 + NaBO_2 + 2CO_2 \tag{17i}$$

In this embodiment, sodium bicarbonate is only partially dehydratively decarboxylated to sodium carbonate. It is possible that sodium bicarbonate is converted to sodium carbonate in situ in the reaction shown in equation (12i), where the reaction preferably occurs at a temperature between about 175° C. and about 200° C. The reaction shown in equation (11) can be combined with the reaction shown in equation (12i), as shown in equation (19).

$$4NaBO_2 + 4CO_2 + 2H_2O \rightarrow 2Na_2CO_3 + 2CO_2 + 2H_2O + 2B_2O_3 \tag{19}$$

A substantial energy savings occurs when sodium carbonate is the product rather than sodium oxide. In addition, carbonate is also a hard base, and will affect the assymmetric cleavage and disproportionation. These effects of carbonate are described in Huheey, "Inorganic Chemistry," Chapter 14 (1966, Academic Press), which is incorporated herein by reference in its entirety.

The net reaction of this embodiment is the same as that of the previous embodiment, which is summarized in equation (18). The overall equation is endothermic, where the steps represented by equations (11), (16), and (17i) are the key energy producing steps in the process. Thermodynamic values for each of the reactions in this embodiment are shown below. As shown, the reaction consumes only borate, carbon, and water and produces only sodium borohydride and carbon dioxide. All other reagents are regenerated

|  |  |  | BTU/lb $NaBH_4$ |  |
|---|---|---|---|---|
| $4NaBO_2 + 4CO_2 + 2H_2O$ | → | $4NaHCO_3 + 2B_2O_3$ | −126 BTU | (−133 kj) |
| $4NaHCO_3$ | → | $2Na_2O + 4CO_2 + 2H_2O$ | 2254 BTU | (2378 kj) |
| $12HBr$ | → | $6H_2 + 6Br_2$ | 2476 BTU | (2612 kj) |
| $2B_2O_3 + 6C + 6Br_2$ | → | $4BBr_3 + 6CO$ | 2285 BTU | (2411 kj) |
| $6CO + 6H_2O$ | → | $6H_2 + 6CO_2$ | −571 BTU | (−602 kj) |
| $4BBr_3 + 12H_2$ | → | $2B_2H_6 + 12HBr$ | 1746 BTU | (1842 kj) |
| $2Na_2O + 2B_2H_6$ | → | $3NaBH_4 + NaBO_2$ | −2730 BTU | (−2880 kj) |
| $3NaBO_2 + 6C + 6H_2O$ | → | $3NaBH_4 + 6CO_2$ | 8761 BTU | (9243 kj) | within the process. Thus, the process represents a closed loop, requiring only the input of borate, carbon, water, and energy.

| | | BTU/lb NaBH$_4$ | |
|---|---|---|---|
| $4NaBO_2 + 4CO_2 + 2H_2O$ | → $4NaHCO_3 + 2B_2O_3$ | −126 BTU | (−133 kj) |
| $4NaHCO_3$ | → $2Na_2CO_3 + 2CO_2 + 2H_2O$ | 190 BTU | (200 kj) |
| $12HBr$ | → $6H_2 + 6Br_2$ | 2476 BTU | (2612 kj) |
| $2B_2O_3 + 6C + 6Br_2$ | → $4BBr_3 + 6CO$ | 2285 BTU | (2411 kj) |
| $6CO + 6H_2O$ | → $6H_2 + 6CO_2$ | −571 BTU | (−602 kj) |
| $4BBr_3 + 12H_2$ | → $2B_2H_6 + 12HBr$ | 1746 BTU | (1842 kj) |
| $2Na_2CO_3 + 2B_2H_6$ | → $3NaBH_4 + NaBO_2 + 2CO_2$ | −635 BTU | (−670 kj) |
| $3NaBO_2 + 6C + 6H_2O$ | → $3NaBH_4 + 6CO_2$ | 6697 BTU | (7065 kj) |

In this process, a 15% plant inefficiency leads to a loss of about 1004 BTU (1060 kj). This number must be added to about 6697 BTU (7065 kj) necessary for the above reactions, and about 8935 BTU (9426 kj) for the energy equivalent of carbon. Thus, the overall energy needed for this process plant requires about 16636 BTU (17,551 kj), and the overall efficiency of the process is about 65% (10,752 BTU/16636 BTU×100).

What is claimed is:

1. A process for producing borohydride compounds, which comprises:
   (A) reacting carbon dioxide and water with a metaborate compound of formula $YBO_2$, where Y is a monovalent cationic moiety, thereby providing $YHCO_3$ and $B_2O_3$;
   (B) converting the $YHCO_3$ into $Y_2O$, carbon dioxide, and water;
   (C) reacting the $B_2O_3$ with carbon and a halide compound of formula $X_2$ to obtain $BX_3$ and carbon monoxide, wherein X is selected from the group consisting of F, Cl, Br, I, and At;
   (D) reacting the $BX_3$ with hydrogen has been added to obtain $B_2H_6$; and
   (E) reacting the $Y_2O$ with $B_2H_6$ to obtain $YBH_4$ and $YBO_2$.

2. The process according to claim 1, wherein Y is selected from the group consisting of the alkali metals, pseudo-alkali metals, an ammonium ion, quaternary amines of formula $NR_4^+$, and a mixture thereof, and wherein R is independently hydrogen, straight or branched $C_1$ to $C_4$ alkyl group, or a mixture thereof.

3. The process according to claim 2, wherein Y is selected from the group consisting of Li, Na, K, Rb, Cs, Fr, $NH_4^+$, Ti, and quaternary amines of formula $NR_4^+$, wherein R is independently selected from hydrogen and straight or branched $C_1$ to $C_4$ alkyl group.

4. The process according to claim 3, wherein Y is selected from the group consisting of Na, Li, and K.

5. The process according to claim 1, wherein the $BX_3$ of step (D) is with an aldehyde selected from the group consisting of formaldehyde,/benzaldehyde, acetaldehyde, and mixtures thereof.

6. The process according to claim 1, wherein the $YBO_2$ produced in step (E) is recycled for use in step (A).

7. The process according to claim 1, wherein the carbon dioxide produced in step (B) is recycled for use in step (A).

8. The process according to claim 1, wherein the water produced in step (B) is recycled for use in step (A).

9. A process for producing borohydride compounds, which comprises:
   (A) reacting carbon dioxide and water with a metaborate compound of formula $YBO_2$, where Y is a monovalent cationic moiety, thereby providing $YHCO_3$ and $B_2O_3$;
   (B) converting the $YHCO_3$ into $Y_2CO_3$, carbon dioxide, and water;
   (C) reacting the $B_2O_3$ with elemental carbon has been added and an X-containing compound of formula $X_2$ to obtain $BX_3$ and carbon monoxide, wherein X is selected from the group consisting of F, Cl, Br, I, and At;
   (D) reacting the $BX_3$ with hydrogen has been added to obtain $B_2H_6$; and
   (E) reacting the $Y_2CO_3$ with $B_2H_6$ to obtain $YBH_4$, $YBO_2$, and carbon dioxide.

10. The process according to claim 9, wherein Y is selected from the group consisting of the alkali metals, pseudo-alkali metals, an ammonium ion, quaternary amines of formula $NR_4^+$, and a mixture thereof, R is independently hydrogen, straight or branched $C_1$ to $C_4$ alkyl group, or a mixture thereof.

11. The process according to claim 9, wherein Y is selected from the group consisting of Li, Na, K, Rb, Cs, Fr, $NH_4^+$, Tl, and quaternary amines of formula $NR_4^+$, wherein R is independently selected from hydrogen and straight or branched $C_1$ to $C_4$ alkyl group.

12. The process according to claim 9, wherein Y is selected from the group consiing of Na, Li, and K.

13. The process according to claim 9, wherein the $BX_3$ of step (D) is reacted with an aldehyde.

14. The process according to claim 13, wherein the aldehyde is selected from the group consisting of formaldehyde, benzaldehyde, acetaldehyde, and mixtures thereof.

15. The process according to claim 9, wherein the $YBO_2$ produced in step (E) is recycled for use in step (A).

16. The process according to claim 9, wherein the carbondioxide produced in steps (B) and (E) is recycled for use in step (A).

17. The process according to claim 9, wherein the water produced in step (B) is recycled for use in step (A).

18. The process according to claim 1, wherein the $BX_3$ of step (D) is reacted with a silicon hydride to obtain diborane and $SiX_4$.

19. The process according to claim 9, wherein the $BX_3$ of step (D) is reacted with a silicon hydride to obtain diborane and $SiX_4$.

20. The process according to claim 1, wherein the $BX_3$ of step (D) is reacted with hydrogen.

21. The process according to claim 9, wherein the $BX_3$ of step (D) is reacted with hydrogen.

* * * * *